United States Patent [19]

Konishi

[11] Patent Number: 5,046,762
[45] Date of Patent: Sep. 10, 1991

[54] VACUUM BAG PROBE

[75] Inventor: Masato H. Konishi, Woodinville, Wash.

[73] Assignee: Macro Technologies, Inc., Redmond, Wash.

[21] Appl. No.: 357,334

[22] Filed: May 25, 1989

[51] Int. Cl.⁵ .............................................. F16L 17/00
[52] U.S. Cl. ..................................... 285/38; 285/200; 285/206; 285/330
[58] Field of Search ...................... 285/7, 38, 200, 206, 285/330, 360, 175, 333, 355, 390

[56] References Cited

U.S. PATENT DOCUMENTS

| | | | |
|---|---|---|---|
| 1,371,092 | 3/1921 | Holland et al. | 285/200 X |
| 1,419,471 | 6/1922 | Reynolds | 285/200 X |
| 2,636,658 | 4/1953 | Baumer et al. | 285/200 X |
| 3,458,084 | 7/1969 | Laurizio | 285/205 X |
| 3,499,670 | 3/1970 | Woody | 285/355 |
| 3,848,516 | 11/1974 | Merriman | 285/200 X |
| 4,572,551 | 2/1986 | Jaquette | 285/355 X |
| 4,595,126 | 6/1986 | Holmes | 285/200 X |
| 4,603,889 | 8/1986 | Welsh | 285/175 |
| 4,632,433 | 12/1986 | Kimura | 285/38 |
| 4,732,415 | 3/1988 | Matin et al. | 285/360 X |
| 4,763,693 | 8/1988 | Valley | 285/355 X |
| 4,838,491 | 6/1989 | Bennett et al. | 285/355 X |
| 4,852,916 | 8/1989 | Johnson | 285/200 X |
| 4,858,966 | 8/1989 | Ciriscioli et al. | 285/200 |

OTHER PUBLICATIONS

Catalog pages, Zip-Vac, 117 Oravetz Road, Auburn, Washington; 9/86.

Primary Examiner—Randolph A. Reese
Assistant Examiner—Franco S. DeLiguori
Attorney, Agent, or Firm—Seed and Berry

[57] ABSTRACT

An improved vacuum bag probe has a top section and a base section which are manufactured from inexpensive stamped materials. A threaded, axially movable and rotatably fixed engagement mechanism is provided which resists wear but does not prevent the application of secondary compressive forces due to pressure differentials between the top and base sections, such as are experienced in an autoclave.

11 Claims, 2 Drawing Sheets

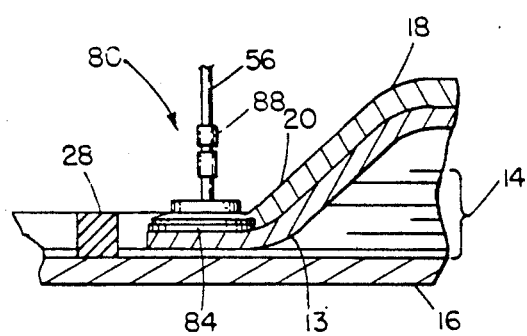
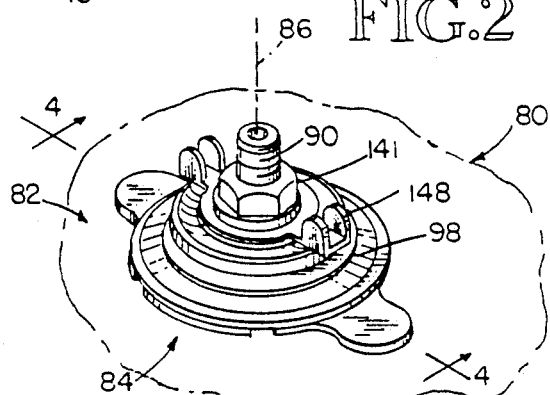
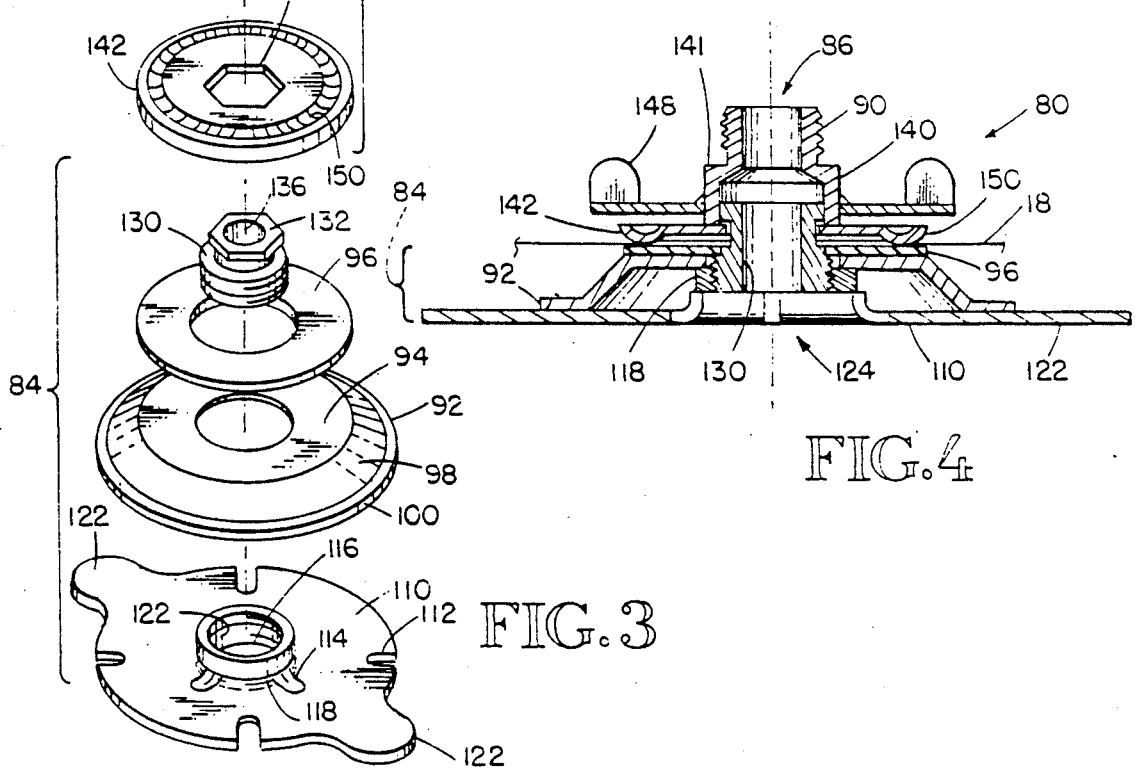

VACUUM BAG PROBE

TECHNICAL FIELD

The invention relates to methods and apparatus for evacuating a sealed environment. More specifically, the invention relates to vacuum bag probes for forming an airtight passageway through a vacuum bag for use during autoclave and the like procedures for composite structures.

BACKGROUND OF THE INVENTION

Composite materials are increasingly used in a variety of industries, including the automobile, aerospace, marine, and consumer products markets. Composite materials are broadly defined as structures which comprise two or more different materials, such as glass fibers embedded in an epoxy resin or graphite fibers embedded in an epoxy resin. Other combinations are well known to those of ordinary skill in the art. A variety of plastic resins other than epoxy are also used as one component of the composite.

In general, structures manufactured from composite materials, such as panels, I-beams, T-beams, and other more convoluted shapes comprise a plurality of layers of uncured or partially cured composite plies. The plies are usually supplied in a continuous form resembling a roll of tape which is then cut to the desired length. The plies may be tacky at room temperature, as in the case of thermosetting resins, or nontacky (i.e., slippery), as in the case of thermoplastic resins. In either case, after the plies have been laid up on a forming tool, the resin must be cured and the laminate stack debulked to form a consolidated panel, I-beam, T-beam, etc. Some composite materials, typically the fiberglass/resin composites, cure at room temperature. In a preferred method, especially in the aerospace industry, where graphite fiber/epoxy resin composites are common, curing at elevated temperatures and pressures is achieved in an autoclave.

In an autoclave curing process, a plurality of tacky layers of composite material are laid up one on top of another. The composite materials may be partially debulked by hand, such as with a roller. After the entire composite stack has been laid up on a forming tool, a layer of flexible material, commonly referred to as a "vacuum bag," is sealed to the forming tool about the periphery of the composite lay up. The forming tool, composite part, and vacuum bag assembly is then positioned in an autoclave, where the entire assembly is processed at elevated temperatures and pressures.

During the autoclave procedure, the volume between the vacuum bag and forming tool is evacuated to remove as much gas as possible from between the layers of composite material and to at least partially debulk the laminate stack. For this purpose, vacuum bag probes, such as those shown in FIGS. 5 and 6, are applied to a vacuum bag in the manner shown in FIG. 1.

Probes of this type have a base plate or base section 10, 12 which is positioned underneath the vacuum bag, on top of a breather layer 13, which is positioned above the composite layers 14 and above a portion of the forming tool 16 which surrounds the periphery of the composite layers. The vacuum bag 18 is provided with a vacuum bag aperture 20 so that base apertures 24 and 26 (see FIGS. 5 and 6) can be positioned in registration therewith. The vacuum bag 18 is sealed to the forming tool by a peripheral seal 28, which may take the form of double-sided tape or a resilient silicone gasket.

The probes shown in FIGS. 5 and 6 also have top sections 30, 32, which mate with the base sections 10, 12 so as to form an airtight seal between the base section and vacuum bag, and the vacuum bag and top section. A resilient gasket 34, 36 is typically provided to form a good seal between the vacuum bag and the base plate, while a smooth surface 38, 40 is provided on the underside of the top section 30, 32 to form a good seal between the top section 30, 32 and the vacuum bag 18.

The top sections 30, 32 are provided with mating mechanisms 44, 46, which engage corresponding structures 48, 50 in the base sections 10, 12. The mating mechanisms serve to apply a compressive force between the top and base sections so as to effect at least an initial seal between the top and base sections and the vacuum bag 18. The top sections are also provided with bores 52, 54, which register with the apertures 24, 26 in the bases so that a vacuum can be drawn therethrough from a source 56, shown in FIG. 1.

Substantial disadvantages are associated with each of the prior art probes shown in FIGS. 5 and 6. The mating mechanism 46 and corresponding structure 48 of the probe shown in FIG. 5 is of the bayonet type. That is, the top section 30 is provided with a radially directed, split tool pin 58 which engages opposed female receptacles 60 in the aperture 24 of the base section 10. The aperture 24 is provided with opposed, wedgelike ramps 62 which draw the smooth surface 38 against the gasket 34 when the top section 30 is rotated approximately 90 degrees in a clockwise direction. This structure advantageously permits external air pressure to further force the top section 30 against the base section 10 (see FIG. 1) as air is evacuated from the sealed environment beneath the vacuum bag 18. That is, the bayonet mechanism does not resist the further application of downward pressure from the elevated atmospheric pressure in the autoclave. In this mechanism, the primary sealing function is provided by the pressure differential between the top and base sections rather than by the bayonet mechanism. A very good seal can be effected in this manner. However, the bayonet mechanism itself contributes to a substantially degraded environment which can both ruin the vacuum system and introduce undesirable contaminants into the forming tool environment.

The base 10 is typically machined from a relatively soft aluminum. The split tool pin 58 tends to dig into the ramp 62 because of the relatively small contact surface therebetween. As a result, metal shavings are dislodged from the base 10 and can enter and undesirably contaminate both the vacuum system and the forming tool environment. This result is especially disadvantageous in the aerospace industry, where very high-quality standards must be maintained.

In addition, once the bayonet-style mating mechanism 44 begins to wear, the ability to form an initial vacuum seal between the top and base sections is degraded. The split tool pin 58 also disadvantageously blocks the bore 52 in the top section. A high-pressure, quick-disconnect fitting having a one-way valve is typically threaded on the exposed end 59 of the probe. The check valve may become clogged or sticky. The split tool pin 58 disadvantageously interferes with the insertion of a screwdriver or other device into the bore for manipulation or removal of the one-way valve.

The mating mechanism 46, shown in FIG. 6, overcomes the above-described wear/contamination problem associated with the probe of FIG. 5. However, this probe introduces other disadvantages which severely compromise the integrity of the vacuum seal.

As shown in FIG. 6, the mating mechanism 46 is of the threaded variety. The base section 12 is provided with corresponding threads in the corresponding structure 50. Substantially less wear occurs with this mating mechanism, as opposed to the bayonet-type mating mechanism 44 of FIG. 5, because of the increased contact area between the mating structures. The threaded mating mechanism 46 of the probe shown in FIG. 6 also provides clear access to the bore 54 and thus does not have the access disadvantage associated with the bayonet-style mating mechanism 44 of the probe shown in FIG. 5. However, this threaded-style mating mechanism 46 positively fixes the position of the top section 32 with respect to the base section 12 in the axial direction. As a result thereof, pressure differentials between the base section and top section cannot assist the action of the mating mechanism to further force the smooth surface 40 to the vacuum bag 18, resilient gasket 36, and base section 12.

Technicians using the type of probe shown in FIG. 6 must therefore assure that each and every FIG. 6-type probe is thoroughly tightened down to effect a good seal. Probes are typically provided every nine square feet of area on the vacuum bag 18. Autoclaves are presently available which can process forming tools having dimensions in excess of 20 by 90 feet. Therefore, approximately 200 probes of the type shown in FIGS. 5 and 6 must be applied to the vacuum bag. Failure of any one of the probes (such as by failure to appropriately tighten down one of the probes of FIG. 6) can result in the entire cured composite structure being ruined.

In view of the above, an improved vacuum probe is needed which does not suffer from the contamination and wear problems associated with the probe of FIG. 5, which does not resist the application of secondary compressive forces due to pressure differentials between the top and base sections, as does the probe of FIG. 6, and which provides an unobstructed through-bore to facilitate access to a quick-release valve at the end of the through-bore.

In addition to the above, both the probes of FIGS. 5 and 6 utilize bases 10, 12 which are made from single blocks of aluminum. Grooves 64, 66 must be machined or milled into the bases to provide air passageways from the periphery of the bases to the base apertures 24, 26. The bases are thus relatively expensive. Therefore, in addition to the abovedescribed needs, a need exists for a base section which can be inexpensively constructed with appropriate air passageways.

SUMMARY OF THE INVENTION

It is therefore an object of the present invention to provide a vacuum probe which resists excessive wear of the mating surfaces and which does not resist the application of compressive forces due to pressure differentials between the top and base sections.

It is another object of the invention to achieve the above object without obstructing the probe throughbore.

It is yet another object of the invention to provide a vacuum bag probe which can be manufactured from inexpensive metal stampings.

The invention achieves the above objects and advantages, and other objects and advantages which will become apparent from the description which follows, by providing a base section having a sealing surface and an air passageway for passing air through the base section, a top section engageable with the base section and a threaded engagement mechanism for applying a compressive force between the top section and the base section. The threaded engagement mechanism does not resist the application of a second compressive force due to pressure differentials between the top and base sections, such as those which occur when the probe is applied to a vacuum bag and the vacuum bag is evacuated.

In the preferred embodiment of the invention, the top section has a sealing flange which is engageable with an upper sealing surface on the base section. The threaded engagement mechanism includes an elongated annulus having a radially extending hexagonal head at one end received in an elongated hexagonal cavity in the top section. The hexagonal head is retained in the elongated hexagonal cavity by an offset hexagonal retention lip at one end of the cavity. The other end of the elongated annulus has a threaded section which mates with a correspondingly threaded aperture in the base section. The elongated annulus is rotatably fixed to and axially movable over a limited distance with respect to the top section. The probe thus advantageously uses a threaded engagement mechanism to form at least an initial airtight seal between the top section and base section thus forming an unobstructed through-bore while preventing excessive wear on the mechanism. The mechanism allows pressure differentials between the top and base sections, such as those which occur when the probe is applied to a vacuum bag in an autoclave environment, to apply a supplemental sealing force to the probe. A resilient gasket is preferably provided between the top and base sections in the preferred embodiment. The probe is easily manufactured from conventional fittings and inexpensive metal stampings.

BRIEF DESCRIPTION OF THE DRAWINGS

FIG. 1 is a partial, side elevational, environmental view of the vacuum bag probe invention applied to a vacuum-bagged composite structure for curing in an autoclave.

FIG. 2 is an isometric view of the probe shown in FIG. 1.

FIG. 3 is an exploded isometric view of the probe.

FIG. 4 is an enlarged sectional view of the probe taken along line 4—4 of FIG. 2.

DETAILED DESCRIPTION OF THE INVENTION

Figure 5:
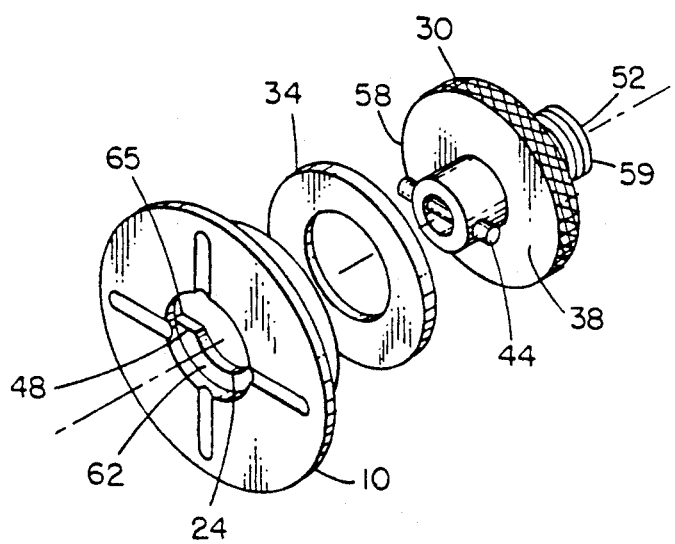
FIG. 5 an exploded isometric view of a prior art bayonet-style probe.
Figure 6:
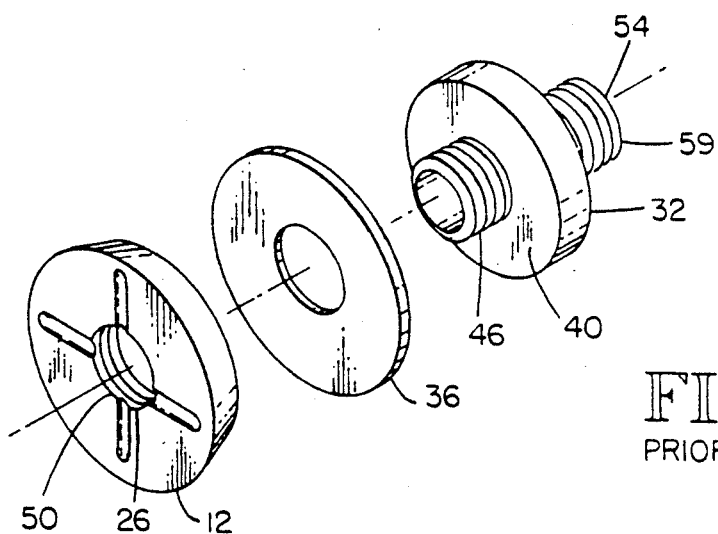
FIG. 6 is an isometric exploded view of a threaded-style prior art probe.

An improved vacuum bag probe in accordance with the present invention is generally indicated in FIGS. 1 through 4 (at reference numeral 80). The probe has a top section 82 which is threadably engageable with a base section 84 so as to form an airtight seal between a section of a vacuum bag 18 and a substantially unobstructed through-bore 86.

As further shown in FIG. 1, the probe 80 is connected to a vacuum source 56 by a conventional, quick-disconnect valve 88 which engages threads 90 on the top section 82. In this way, a vacuum can be drawn through the base section and into the vacuum source 56 to debulk and consolidate a laminate stack of composite layers 14 during an autoclave curing process, vacuum bag debulking step, or the like. The invention substantially reduces contamination problems associated with bayonet-style devices while permitting pressure differentials between the top and base sections to enhance the seal formed between the vacuum bag 18 and the through-bore 86.

The base section 84 has an annular upper portion 92. The upper portion has a substantially smooth, upper sealing surface 94 which supports an annular resilient gasket 96. The gasket is made of silicone or another suitable material. A downwardly depending, peripheral rim 98 extends from the perimeter of the upper sealing surface 94 and terminates in a circumferential ring 100 which is connected, such as by welding, to a circular bottom portion 110.

The bottom portion 110 has a plurality of openings 112 around the perimeter thereof and a plurality of centrally located openings 114 adjacent to a central aperture 116. A centrally located cylinder 118 surrounds the central aperture 116 and is provided with internal threads 120. Radially extending ears (122) are provided to facilitate positive manual location of the base section and for application of torque thereto through the vacuum bag 18.

Both the top and base sections 82, 84 are preferably made from inexpensive metal stampings, such as aluminum or steel. The cylinder 118 can be connected to the upper portion 92, bottom portion 100, or both, by welding. The base section 84 thus defines a vertical bore 124 for passage of air to the top section 82. The openings 112, 114 provide air passageways from the perimeter of the base section to the vertical bore.

The top section 82 is provided with an axially movable and substantially rotatably fixed engagement mechanism 130. The engagement mechanism has a radially extending hexagonal head 132 at one end and external threads 134 at the other end. A central bore 136 is provided in-between. The external threads 134 are provided with a pitch cooperative with the internal threads 120 on the cylinder 118. Rotation of the engagement mechanism 130 in a clockwise direction causes the engagement mechanism to be drawn into the base section 84.

The hexagonal head 132 of the engagement mechanism 130 is received in an elongated hexagonal cavity 140 within a main body 141. The cavity has a length which is greater than the thickness of the hexagonal head. The open end of the hexagonal cavity is partially closed by an annular sealing flange 142 to retain the hexagonal head 132 for reciprocal motion therein. The sealing flange is provided primarily to form a seal between the vacuum bag 18 and the top and base sections 82, 84 respectively.

During assembly, the hexagonal head 132 of the engagement mechanism 130 is threaded through a corresponding hexagonal opening 144 in the center of the annular sealing flange 142. The hexagonal cavity 140 of the main body 141 is then positioned over the hexagonal head. The annular sealing flange 142 is then rotated approximately 30 degrees so that the hexagonal opening 144 is out of registration with the hexagonal head 132 and the hexagonal cavity 140. The sealing flange is then connected to the main body, such as by welding. The engagement mechanism 130 is therefore free to move axially over a limited distance (i.e., the hexagonal head 132 is free to reciprocate within the hexagonal cavity 140) defined by the length of the hexagonal cavity 140.

However, rotation of the main body 141 is transferred to the engagement mechanism 130 and external threads 134 so as to apply a compressive force between the top and base sections 82, 84 respectively. A rotation ring 146 having radially extending ears is fixedly attached to the main body 141 to facilitate manual rotation of the upper section with respect to the base section.

As is apparent from FIGS. 1–4 and the above discussion, an unobstructed through-bore 86 is provided when the top and base sections are assembled. Access to the quick-disconnect valve 88 is therefore unimpeded. The engagement mechanism also provides the advantages of a threaded connection (a large area of surface contact which does not tend to produce metal shavings) without preventing the application of a secondary sealing force due to pressure differentials generated in the autoclave and by the vacuum source 56.

Both the top and base sections 82, 84 are manufactured from inexpensive metal stampings rather than expensive castings which must be machined. The annular sealing flange 142, for example, is preferably constructed from a metal stamping so as to provide a downwardly extending, circumferential bulge 150 which depresses the vacuum bag 18 against the gasket 96 to form a circular seal with respect thereto, in contrast with the machined surfaces which are typically present on prior art probes. The main body 141 having the hexagonal cavity 140 can be fitted or shaped to accept any form of connection to suit the requirement of the end user. A suitable fitting shown in the drawings is Model 316, from Cajon Company, Macedonia, Ohio.

As will be appreciated by those of ordinary skill in the art, the invention achieves the advantages of both the bayonet-style and screw-style vacuum bag probes at a lower cost than can be achieved by either style. Various mechanical modifications of the invention are contemplated. For example, the shape of the hexagonal cavity 140 and engagement mechanism 130 can be varied to a shape other than hexagonal as long as the engagement mechanism is axially movable and substantially rotatably fixed with respect to the top mechanism. Furthermore, the orientation of the engagement mechanism, with respect to the top and base sections, could be reversed. Therefore, the invention is not to be limited by the above description but is to be determined in scope by the claims which follow.

I claim:

1. A vacuum bag probe for connecting a vacuum source to a sealed environment such as a forming tool sealed by a vacuum bag, comprising:

a base section having a lower surface, an upper sealing surface defining a base aperture about an axis, and air passage means for passing air through the lower surface to the base aperture and mating means for mating the base section with an engagement mechanism;

a top section having a sealing flange engageable with the upper sealing surface on the base section and defining a top aperture axially alignable with the base aperture; and an engagement mechanism rotatably fixed to and axially movable over a limited distance with respect to the top section for mating with the base section and for applying a compressive force between the sealing flange on the top section and the upper sealing surface on the base section and for permitting substantial axial compressive movement between the top and base sections after the top and base sections have been fully engaged so that operation of the engagement mechanism effects a substantially airtight seal between the top and base sections and so that subsequent application of a pressure differential between the top and base sections enhances the seal, such as when the probe is applied to a sealed environment and a vacuum is drawn through the top aperture.

2. The probe of claim 1 wherein the top section has an elongated hexagonal retention cavity centered about the axis with a hexagonal, offset retention lip at one end thereof, wherein the engagement mechanism includes an elongated annulus having a radially extending hex head at one end received in the retention cavity, a threaded section at the other end and a bore therebetween, and wherein the base aperture is cooperatively threaded to engage the threaded section on the engagement mechanism, whereby the top and base sections define a continuous, unobstructed passage therethrough when assembled.

3. The probe of claim 2 wherein the upper sealing and lower surfaces of the base section are defined by upper and lower metal stampings connected at the peripheries thereof so as to define a hollow cavity therebetween, wherein the base aperture is defined by a base annulus having internal threads cooperative with the threaded section on the engagement mechanism, and wherein the air passage means includes apertures in the periphery of the lower surface and adjacent to the base annulus for the passage of air from the periphery of the lower surface, through the base annulus and to the top aperture on the top section.

4. The probe of claim 3 wherein the top section has radially extending ears for the application of torque thereto.

5. The probe of claim 4 wherein the base section has radially extending ears for the application of torque thereto.

6. The probe of claim 1 wherein the top section has radially extending ears for the application of torque thereto.

7. The probe of claim 1 wherein the base section has radially extending ears for the application of torque thereto.

8. The probe of claim 1 wherein the upper sealing surface and lower surface of the base section are defined by inexpensive upper and lower metal stampings connected at the peripheries thereof so as to define a hollow cavity therebetween, wherein the base aperture is defined by a base annulus between the upper and lower metal stampings, and wherein the air passage means includes apertures in the periphery of the lower surface and adjacent to the base annulus for the passage of air from the periphery of the lower surface, through the base annulus and to the top aperture on the top section.

9. A vacuum bag probe for connecting a vacuum source to a sealed environment such as a forming tool sealed by a vacuum bag, comprising;
a base section having a sealing surface and mating means for mating the base section with an engagement mechanism, the base section also defining a base air passageway for passing air through the base section;
a top section engageable with the sealing surface on the base section and defining a top air passageway for passing air through the top section; and
an engagement mechanism rotatably fixed to and axially movable over a limited distance with respect to the top section for applying a compressive force between the top section and the sealing surface on the base section and for permitting substantial axial, compressive movement between the top and base sections after the top and base sections have been fully engaged so that operation of the engagement means effects a substantially airtight seal between the top and base sections and so that subsequent application of a pressure differential between the top and base sections enhances the seal such as when the probe is applied to a sealed environment and a vacuum is drawn through the top air passageway.

10. The probe of claim 9 wherein the top section has an elongated hexagonal retention cavity with a hexagonal, offset retention lip at one end thereof, wherein the engagement mechanism includes an elongated annulus having a radially extending hex head at one end received in the retention cavity, a threaded section at the other end and a bore therebetween, and wherein the base section is cooperatively threaded to engage the threaded section on the engagement mechanism, whereby the top and base sections define a continuous, unobstructed passage therethrough when assembled.

11. A method for evacuating a vacuum bag, comprising the steps of:
placing a vacuum bag probe base section having a sealing surface mating means for mating the base section with an engagement mechanism and a base air passageway beneath a vacuum bag;
forming an aperture in the vacuum bag above the probe base and sealing the bag to a forming tool;
rotatably fixing a threaded engagement mechanism to a vacuum bag probe top section and permitting relative axial movement between the engagement mechanism and the top section over a limited distance;
threadably engaging the engagement mechanism of the top section to the mating means on the base section so as to form an air passageway through the aperture;
applying a compressive force between the top section and the sealing surface on the base section to effect a seal through the threaded engagement mechanism which does not resist the application of a second compressive force due to pressure differentials between the top and base sections; and
applying a vacuum to the top air passageway to evacuate the vacuum bag and generate a pressure differential between the top and base sections so that the seal is improved.

* * * * *